Dec. 21, 1943.   R. W. McOMIE ET AL   2,337,262
PROCESS FOR COMPLETELY REGENERATING CONTAMINATED SOLUTIZER SOLUTION
Filed May 28, 1941
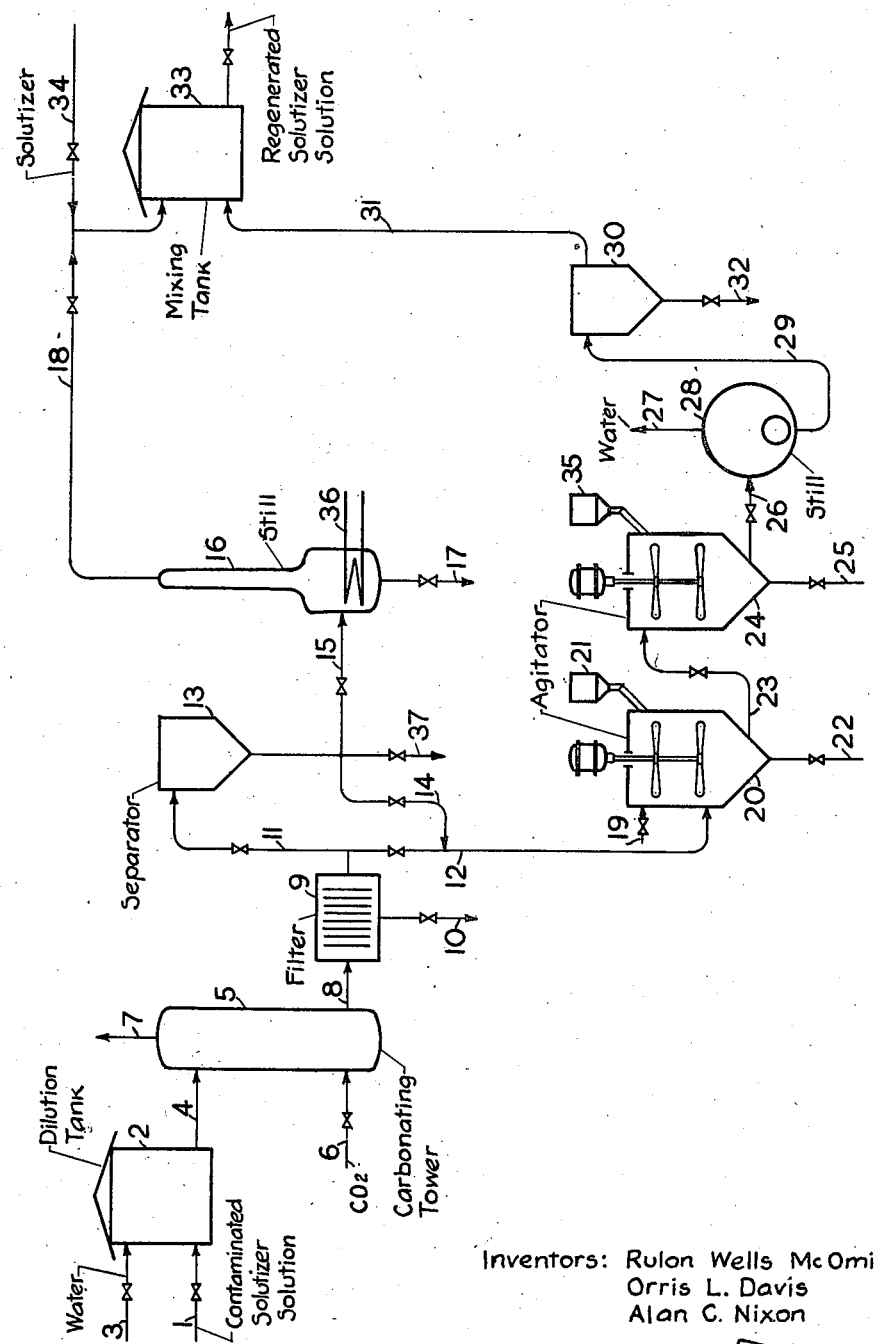
Inventors: Rulon Wells McOmie
Orris L. Davis
Alan C. Nixon
By their Attorney Patented Dec. 21, 1943

2,337,262

UNITED STATES PATENT OFFICE 2,337,262

PROCESS FOR COMPLETELY REGENERATING CONTAMINATED SOLUTIZER SOLUTIONS

Rulon Wells McOmie, Martinez, Orris L. Davis, Oakland, and Alan C. Nixon, San Francisco, Calif., assignors to Shell Development Company, San Francisco, Calif., a corporation of Delaware Application May 28, 1941, Serial No. 395,506

15 Claims. (Cl. 252—192)

This invention relates to the art of refining hydrocarbons by extraction with so-called solutizer solutions, and more particularly to a process for regenerating solutizer solution. Specifically, it is concerned with a process for treating contaminated solutizer solution to remove solids and resinous emulsifiers which have accumulated in said solution during its use, whereby the solution is completely regenerated.

The solutizer process by means of which mercaptans and other weak organic acids contained in sour hydrocarbon distillates, and more particularly in gasoline distillates, are extracted with solutizer solution, i. e., aqueous solutions of alkali metal hydroxides containing solutizers, is well known. The solutizer process has been described, and the several compounds particularly suitable as solutizers have been enumerated in a series of patents and patent applications, as well as in the general literature, for example, in the Yabroff et al. U. S. Patents 2,149,379, 2,149,380, 2,152,166, 2,152,720, 2,152,723, 2,164,851, 2,186,398, 2,202,039, 2,223,798, 2,229,995; Refiner and Natural Gasoline Manufacture, May, 1939, pages 171 to 176, and March, 1940, pages 73 to 76; Industrial and Engineering Chemistry, vol. 32, pages 257 to 262 (February, 1940); Chemical and Metallurgical Engineering, vol. 47, pages 776 to 778 (November, 1940); Oil and Gas Journal, vol. 39, No. 26, pages 45 to 46 (November 7, 1940), etc.

The more desirable substances capable of acting as solutizers being relatively expensive, it sometimes becomes necessary that the solution be regenerated and used over and over to obtain the maximum operating economy.

In the ordinary course of treatment in a solutizer plant, the regeneration of solutizer solution is carried out by steam stripping. The fat solutizer solution containing mercaptans and other weak acids extracted from sour hydrocarbon distillate is subjected to steam stripping in a continuous regeneration to result in a lean solution of reduced content of mercaptans and weak acids, and ready to be recirculated to contact more incoming sour gasoline.

Even though it may be possible theoretically to use a solutizer solution indefinitely by continually regenerating it by steam stripping, this method results in certain difficulties. Experience has shown that despite carefully conducted steam stripping, it is not possible to remove all the undesirable substances which may accumulate in the solution during the treatment.

Solutions used a long time tend to form relatively stable emulsions with the hydrocarbon oil under treatment, probably due to gradual accumulation of emulsifiers believed to be resinous substances not removable by steam stripping, which emulsions either reduce the throughput due to retarded settling or cause carry-over of valuable solutizer.

The exact source and chemical composition of the emulsifier are not known. It appears to be a gummy material of a resinous nature. Possible sources of it include cracked gasoline feeds containing dissolved gums, oxidation of small amounts of cracked gasoline dissolved in the solution and oxidation of portions of solutizer solution, such as alkyl phenols which may purposely form part of the solutizer solution or which may accumulate in solutizer solutions when cracked gasoline feeds are treated.

Various expedients have been suggested, some more useful than others, to serve as an aid to and in addition to steam stripping, to obviate the emulsification and foaming difficulties. They include changing the composition of the solutizer solution so as to decrease its tendency to emulsify when contacted with gasoline, for example, by adding thereto various deemulsifiers, and means and agents for cleansing or reconditioning the solution at various intervals.

The first class of expedients mentioned above, namely, addition agents, have not always proved satisfactory. In some cases, though they may be effective in the beginning, their effect is short lived, and they must be added in ever increasing quantity, until finally such procedure becomes impracticable.

Means and agents for cleansing the solution include among others solid adsorbents and solutions, to adsorb or precipitate the emulsifying material. The main difficulty with this type of treatment is that only solutions which are relatively lightly contaminated can be cleansed effectively, and therefore, where the rate of contamination is high, the improvement to be gained is soon dissipated when treatment is resumed.

The object of this invention is to facilitate the treatment of hydrocarbon distillates by means of solutizer solutions. Another purpose is to decrease the costs of operation in solutizer plants by minimizing or preventing losses of valuable solutizer which are suffered when contaminated solutions must be discarded. Still another purpose is to decrease emulsion and foaming difficulties in solutizer plants. A more particular purpose is to provide a process for completely regenerating used solutizer solutions, particularly those containing accumulated emulsifiers.

Our invention is based on the discovery that a used solutizer solution may be completely regenerated by subjecting it to a process which removes all the emulsifying material in it, thus making it possible to produce a solution which has substantially the same composition and properties as the original solutizer solution, said solution being again suitable for use in the solutizer process for the extraction of mercaptans.

Our process consists essentially of the following five main steps:

(1) Neutralizing the contaminated solutizer solution with $CO_2$ to produce a carbonated liquid, thereby precipitating the emulsifier and other impurities as solids and, if alkyl phenols are present, liberating them, whereby a separate oily phase is produced.

(2) Removing the solids, including the emulsifier, from the carbonated liquid.

(3) Recausticizing the carbonated liquid with lime. If an oily phase is present, it may be separated to be discarded or to receive a purification treatment, in which case the aqueous phase may be recausticized alone.

(4) Reconcentrating the recausticized liquid.

(5) If necessary, adding back any solutizer lost, for example in reconcentrating, or discarded with the separated oily phase.

Instead of using lime for recausticizing, we may use metal oxides which are at least slightly soluble in water and whose metal carbonates are substantially insoluble, such as the dioxides of Ba, Sn, and Li.

By a contaminated solutizer solution, we mean one containing an emulsifier which has slowly accumulated during the steam regeneration treatment and which is in solution of colloidally dispersed, thereby causing said solution to have a tendency to form emulsions which may be relatively stable when it is mixed with gasoline in the course of the treatment or to foam excessively when the spent solution is being stripped, thereby hampering the smooth operation of a solutizer plant, or both.

In order to facilitate the neutralization with $CO_2$ and to make possible later recausticizing, the contaminated solutizer solution is usually first diluted with water, preferably distilled water. Solutizer solutions, after having been steam stripped, normally are at least about 2 normal with respect to alkali metal hydroxide. At the time the solution is neutralized with $CO_2$ it should contain alkali metal hydroxide in a concentration preferably not greater than 1.5N. Thus when starting out with a solutizer solution which contains alkali metal hydroxide in concentration of about 6N as is most usually used, it is desirable to carry out any neutralization in a dilution of at least 3:1 distilled water to solutizer solution.

The neutralization with $CO_2$ is advantageously carried out by bubbling $CO_2$ into the diluted solution in a manner which will insure the highest rate of absorption. A conventional type carbonating tower containing baffles, bubble plates or other contact means is to be recommended, as are any other advantageous arrangements for distribution of the gas throughout the liquid, such as spiders and the like.

The contaminated solutizer solution should be neutralized with $CO_2$ to a pH value of 11 or below, and preferably about 10. At pH 10, the resinous emulsifier is precipitated as solids and any alkyl phenols present are liberated. As a result, at least two layers are formed, one of which is an aqueous layer. If alkyl phenols are present, they form an upper oily layer in which the emulsifier and some of the other troublesome solids are dispersed. If alkyl phenols are absent, the emulsifier and other troublesome solids may form a layer which floats on the surface of the aqueous layer, or may remain dispersed in the aqueous phase, depending, among other factors, on their relative specific gravities.

The removal of the solids can be effected by filtering, and in some cases by settling or centrifuging, etc., and may be carried out in any convenient and conventional manner.

After the solids have been removed, all of the carbonated liquid comprising an aqueous phase may be recausticized, or any oily phase, if present, may be first separated and the aqueous phase may alone be recausticized. The latter method will be preferred when the oily layer is known to contain dissolved undesirable material.

The two layers may be separated by simple decantation consisting of separately drawing off the different layers. For this operation a conventional type of separating apparatus will serve.

The lime used for recausticizing is best added as solid lime. Either slaked or unslaked lime is satisfactory, the latter being somewhat preferable. Better settling of the $CaCO_3$ formed and more complete recovery are to be had by adding the lime to the solution while hot, preferably at its boiling temperature or as close to it as is practical with the available equipment. The amount of lime to be added is determined by analyzing for carbonic acid. If carbonation has gone as far as the bicarbonate, the amount to be added should be approximately 5% to 10% in excess of the theoretical amount required by the equation:

$$KHCO_3 + CaO = CaCO_3 + KOH.$$

After recausticizing, the solution and precipitate of $CaCO_3$ formed are separated and the supernatant liquid is removed.

To avoid any loss of KOH or potassium isobutyrate with the precipitate of $CaCO_3$ formed, the precipitate should be washed with water, and the resulting wash water be added to the separated recausticized solution. As a result, starting out, for example, with a contaminated solutizer solution originally containing alkali metal hydroxide or alkali metal hydroxide and alkyl phenolate in a total concentration of about 6N, the recausticized solution and wash water may contain alkali metal hydroxide or alkali metal hydroxide and alkyl phenolate in a concentration of about .6N.

If desired, the recausticized solution may be given a treatment to remove minute quantities of Ca. Essentially this step consists of the addition of an equivalent amount of an acid or an alkali metal salt thereof, the Ca salt of which is completely insoluble in water, such as oxalic acid, phosphoric acid, etc., to precipitate the Ca as oxalate, phosphate, etc., as the case may be. This precipitation is best carried out in a hot solution. Oxalic acid is preferred because the solubility of its calcium salt does not decrease with temperature and hence has less tendency to deposit on the tubes of evaporator equipment.

The reconcentration of the solution is carried out by reboiling in any desired conventional manner.

After reconcentration, the solution should be filtered or settled for some time, to remove a trace of solid material, chiefly calcium salts, which are precipitated during the reconcentration step. If not removed, these solids might in themselves stabilize emulsions if the solution were immediately used to treat hydrocarbon distillate.

An oily layer, if separated from the carbonated liquid, may be discarded, or subjected to a further treatment if it contains appreciable amounts of solutizer, e. g., alkyl phenols. This further treatment normally comprises a distillation to produce purified alkyl phenols and a pitch-like residue.

The final step of replacing any solutizer which may have been lost in the treatment will vary depending on the method of treatment employed. If the two phases of the carbonated liquid are not separated before recausticizing, only a very small amount of solutizer will be lost, and this is easily replaced with fresh solutizer. If an oily phase containing solutizer is first separated, there are two sources of solutizer to be added to the treated aqueous layer:

(1) The solutizer contained in the oily phase treated and purified as explained above.

(2) Fresh solutizer from an outside source.

The process is illustrated in the accompanying drawing which represents a simplified flow diagram of a preferred form.

For simplicity, the drawing does not show all pumps, heat exchangers, by-passes, vents, reboilers, and other auxiliaries, the proper placement of which will be evident at once to those skilled in the art.

Contaminated solutizer solution containing alkyl phenolates and resinous emulsifier is admitted from a source not shown through line 1 into dilution tank 2 where distilled water is added to it, from a source not shown, through line 3. After dilution, the solution is withdrawn through line 4 and conveyed to carbonating tower 5, whence it runs downward over baffles, bubble plates, or other contact means in the tower in counter-current to carbon dioxide, or carbon dioxide mixed with inert gases, which is introduced at the bottom through line 6. Carbon dioxide is adsorbed, the emulsifier is precipitated, and alkyl phenols, if present, are liberated, forming an oily phase. Non-adsorbed gas leaves the tower through vent line 7, and carbonated solution passes through line 8 to filter 9, where solids, including the emulsifier, are removed and dropped out through line 10.

After the filtration, the solid-free liquid may be treated by alternative methods. It may be directly recausticized, or in the case of the existence of two liquid phases, they may be first separated, each to receive a different treatment. If it is found that the oily phase of the filtered liquid contains dissolved undesirable material, preliminary separation is desirable.

If the filtered liquid is to be treated without first separating an oily phase, it leaves filter 9 through line 12 and is transferred to agitator 20 where it is recausticized with lime added from hopper 21. The resulting mixture is stirred by an appropriate stirrer mechanism to precipitate $CaCO_3$. The latter is allowed to settle and supernatant liquid is transferred through line 23 to tank or agitator 24. The precipitate in agitator 20 is washed with water introduced through line 19, and the wash water passes through line 23 to tank 24 where it is combined with the recausticized solution. The precipitate of $CaCO_3$ formed in the reaction is removed from agitator 20 through bottom line 22.

The diluted recausticized solution in tank 24 may be conveyed through line 26 directly to still 28 to be reconcentrated, or if desired, steps may first be taken to remove small amounts of calcium remaining in the solution.

If the latter steps be found necessary, oxalic acid from hopper 35 is added to the dilute recausticized aqueous solution contained in tank 24 in an amount just sufficient to precipitate any small amount of calcium remaining. The precipitate of calcium oxalate is allowed to settle and is removed through bottom line 25 and the calcium free solution is led to still 28 through line 26.

In still 28 the dilute solution is reconcentrated by reboiling, water leaving overhead through vapor line 27 and concentrated solution being withdrawn through line 29 to settling tank 30, where it is allowed to settle for some time to remove the comparatively small amount of solid material, chiefly Ca salts, which are precipitated during the reconcentration step. The clear solution is conveyed through line 31 to mixing tank 3 and the settled solid is removed through bottom line 32.

If two liquid phases are to be separated before recausticization, the filtered liquid is transferred from filter 9 through line 11 to separator 13, where the oily phase is allowed to rise to the top of the aqueous phase, and the two phases are separately and successively withdrawn through line 14 and 15, each to receive its further treatment to be presently described.

First to be withdrawn is the aqueous phase which leaves separator 13 through line 14 an is led to agitator 20 where it is recausticized in substantially the same manner as has been previously described for the filtered liquid which was not first separated into two phases.

The oily layer in separator 13 is withdrawn and may be discarded, through line 37, or else passed through line 15 and led to still 16, equipped with heater 36, where it is purified by distillation. The portion comprising the purified product leaves still 16 overhead through line 18, and after being condensed flows to mixing tank 3. Residue is withdrawn through bottom line 17.

If desired, fresh solutizer may be added to tank 33 from an outside source through line 34.

The following explanation and examples further illustrate our treatment:

When solutizer solution and gasoline are passed in counter-current flow through an extraction tower in which the aqueous phase is continuous an emulsion of the oil in water type may be formed which collects at the top of the solutizer solution. A similar type of emulsion can be formed by stirring solutizer solution and gasoline together, and a stirrer test was accordingly devised whereby small amounts of solutizer solution and gasoline could be caused to form an emulsion under controlled conditions, and the time of settling measured.

(1) A full range cracked gasoline was stirred vigorously with a contaminated aqueous solutizer solution containing potassium hydroxide 6N potassium isobutyrate 1.5N, and potassium phenolate 1.0N under standard conditions. The settling time (time necessary for separation of the two phases) was 3 hours with a rag. Another portion of the same contaminated solutizer solution was diluted with water, neutralized with $CO_2$, filtered, recausticized with lime, and reconcentrated. This treated portion containing potassium hydroxide 6.4N, potassium isobutyrate 1.45N, and potassium phenolate was then stirred with the same full range cracked gasoline, and the settling time was found to have dropped to wo minutes and twenty seconds. The solutions eparated cleanly and no rag remained.

(2) In another experiment a portion of the ;ontaminated solutizer solution was diluted with vater, neutralized with $CO_2$, filtered, and the queous phase was separated, recausticized with ime and reconcentrated. To the reconcentrated queous phase alkyl phenols were added in an mount equal to that which had been removed vith the separated oily phase. This solution was hen stirred with a full range cracked gasoline, nd the settling time in this case was reduced to our minutes and twelve seconds with a clean reak.

We claim as our invention:

1. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to produce a carbonated liquid, thereby selectively precipitating the emulsifier and other impurities as solids, removing said solids, and recausticizing at least a portion of the carbonated liquid.

2. The process of claim 1 wherein the concentration of the alkali metal hydroxide solution is between 2.5 and .5 normal.

3. The process of claim 1 wherein the carbonated liquid is recausticized with lime.

4. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising diluting said solution with water, neutralizing the solution with $CO_2$ to produce a carbonated liquid, thereby selectively precipitating the emulsifier and other impurities as solids, removing said solids, recausticizing at least a portion of the carbonated liquid, and then reconcentrating.

5. The process of claim 4 wherein the water of dilution is distilled water.

6. The process of claim 4 wherein the alkali metal hydroxide content of the concentrated solution is above 2.5N, and that of the diluted solution is between 2.5 and .5N.

7. The process of claim 4 wherein the alkali metal hydroxide concentration of the concentrated solution is about 6N, and that of the diluted solution is about 1.5N.

8. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to a pH of 11 or below to produce a carbonated liquid, thereby selectively precipitating the emulsifier and other impurities as solids, removing said solids, and recausticizing at least a portion of the carbonated liquid.

9. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to a pH of about 10 to produce a carbonated liquid, thereby selectively precipitating the emulsifier and other impurities as solids, removing said solids, and recausticizing at least a portion of the carbonated liquid.

10. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to produce a carbonated liquid, thereby selectively precipitating the emulsifier and other impurities as solids, removing said solids, and recausticizing at least a portion of the carbonated liquid with an amount of lime 5%–10% in excess of that equivalent to the amount of total carbonic acid in said carbonated solution.

11. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to a pH of about 10, thereby converting said hydroxide to bicarbonate and selectively precipitating the emulsifier and other impurities as solids, removing said solids, and recausticizing at least a portion of the carbonated liquid with an equivalent amount of lime necessary to reconvert the bicarbonate to hydroxide.

12. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to produce a carbonated liquid, thereby selectively precipitating the emulsifier and other impurities as solids, removing said solids, recausticizing at least a portion of the carbonated liquid with lime and then treating said recausticized liquid with a small amount of an ionizable compound containing a radical the calcium salt of which is completely insoluble in water.

13. In a process for purifying aqueous alkali metal hydroxide solution containing an organic solubility promoter for mercaptans and a resinous emulsifier accumulated in the course of repeatedly treating hydrocarbon distillates with said solution and regenerating the resulting spent solution, the steps comprising neutralizing said solution with $CO_2$ to produce a carbonated liquid, thereby selectively precipitating the emulsifier and other impurities as solids, removing said solids, recausticizing at least a portion of the carbonated liquid with lime and then treating said recausticized liquid with a small amount of an ionizable compound containing an oxalic acid radical.

14. In a process for purifying aqueous alkali metal hydroxide solution containing a solubility promoter for mercaptans and a resinous emulsifier accumulated in the course of repeatedly treating hydrocarbon distillates with said solution and regenerating the resulting spent solution, said promoter comprising phenolates, the steps comprising neutralizing said solution with $CO_2$ to produce a carbonated liquid, thereby selectively precipitating the emulsifier and other impurities as solids and forming two liquid phases, one an oily phase containing phenols and precipitated emulsifier dispersed therein, and the other an aqueous phase, removing said solids, separating said liquid phases, recausticizing the aqueous phase with lime, and returning at least a portion of the oily phase substantially free from emulsifier to the recausticized aqueous solution.

15. In a process for purifying aqueous alkali metal hydroxide solution containing a solubility promoter for mercaptans and a resinous emulsifier accumulated in the course of repeatedly treating hydrocarbon distillates with said solution and regenerating the resulting spent solution, said promoter comprising phenolates, the steps comprising neutralizing said solution with $CO_2$ to produce a carbonated liquid, thereby selectively precipitating the emulsifier and other impurities as solids and forming two liquid phases, one an oily phase containing the phenols and precipitated emulsifier dispersed therein, and the other an aqueous phase, removing said solids, separating said liquid phases, recausticizing the aqueous phase with lime, distilling the oily phase to recover phenols and returning them to the recausticized solution.

RULON WELLS McOMIE.
ORRIS L. DAVIS.
ALAN C. NIXON.